United States Patent
Myntti

(10) Patent No.: US 7,302,971 B2
(45) Date of Patent: Dec. 4, 2007

(54) UMBRELLA VALVE AND ASSEMBLY

(75) Inventor: Matthew F. Myntti, Jacksonville, FL (US)

(73) Assignee: Vernay Laboratories, Inc., Yellow Springs, OH (US)

( * ) Notice: Subject to any disclaimer, the term of this patent is extended or adjusted under 35 U.S.C. 154(b) by 145 days.

(21) Appl. No.: 11/021,476

(22) Filed: Dec. 22, 2004

(65) Prior Publication Data

US 2006/0130917 A1    Jun. 22, 2006

(51) Int. Cl.
*F16K 15/14* (2006.01)
(52) U.S. Cl. ............... 137/852; 137/512.15; 137/515; 137/515.5; 137/859
(58) Field of Classification Search ........... 137/512.15, 137/515, 515.5, 852, 859
See application file for complete search history.

(56) References Cited

U.S. PATENT DOCUMENTS

| | | | |
|---|---|---|---|
| 2,329,960 A * | 9/1943 | Verheul | 137/515 |
| 2,912,999 A * | 11/1959 | Kersh | 137/512.4 |
| 2,913,000 A | 11/1959 | Roberts | |
| 3,903,922 A * | 9/1975 | Buckman | 137/852 |
| 4,593,720 A | 6/1986 | Bergandy | |
| 5,598,872 A | 2/1997 | Kasugai et al. | |
| 6,357,468 B1 | 3/2002 | Roussel | |
| 6,412,514 B1 * | 7/2002 | Raftis | 137/111 |
| 6,470,904 B1 | 10/2002 | Tai et al. | |
| 7,108,361 B2 | 9/2006 | Kitabatake et al. | |
| 2002/0002350 A1 | 1/2002 | Larrain et al. | |

FOREIGN PATENT DOCUMENTS

EP    1479521    11/2004

* cited by examiner

*Primary Examiner*—Ramesh Krishnamurthy
(74) *Attorney, Agent, or Firm*—Thompson Hine LLP

(57) ABSTRACT

An umbrella valve includes an umbrella-valve body having a stem, a flexible umbrella, and a flange. The umbrella and the flange are each attached to, and extend radially outward from, the stem. The flange has at least one fluid passage. The umbrella valve can be placed in a valve housing having a sealing-surface portion. The umbrella, when the umbrella-valve body is placed in the valve housing, is pushed away from the sealing-surface portion under a forward fluid flow and is pushed against the sealing-surface portion under a reverse fluid flow. An umbrella-valve assembly includes the umbrella valve and the valve housing.

20 Claims, 6 Drawing Sheets

UMBRELLA VALVE AND ASSEMBLY

TECHNICAL FIELD

The present invention relates generally to fluid flow, and more particularly to an umbrella valve and to an umbrella valve assembly.

BACKGROUND OF THE INVENTION

Conventional valves for blocking and unblocking fluid flow include umbrella valves. A known umbrella valve assembly includes an umbrella valve positioned in a valve housing. The umbrella valve has a flexible umbrella. The umbrella is pushed away from a sealing surface (such as a valve seat) of the valve housing under a forward fluid flow allowing passage of the fluid around the umbrella. The umbrella is pushed against the sealing surface under a reverse fluid flow preventing passage of the fluid around the umbrella.

Still, scientists and engineers continue to seek improved umbrella valves and improved umbrella valve assemblies.

SUMMARY OF THE INVENTION

A first expression of an embodiment of the invention is for an umbrella valve assembly including an umbrella valve and a valve housing. The umbrella valve includes a stem, a flexible umbrella, and a flange. The stem includes a longitudinal axis. The umbrella and the flange each are attached to, and extend radially outward from, the stem. The flange has at least one fluid passage. The valve housing has a sealing-surface portion, and the umbrella valve is located in the valve housing. The umbrella is pushed away from the sealing-surface portion under a forward fluid flow, and the umbrella is pushed against the sealing-surface portion under a reverse fluid flow.

A second expression of an embodiment of the invention is for an umbrella valve assembly including a valve housing and an umbrella valve. The valve housing has an inner wall surface which surrounds a bore having a longitudinal axis, which has a sealing-surface portion, and which has a circumferential recess. The umbrella valve includes a stem having a longitudinal axis and includes a flexible umbrella and a flange each attached to, and extending radially outward from, the stem. The umbrella valve is located in the bore with the longitudinal axis of the stem substantially coaxially aligned with the longitudinal axis of the bore. The flange has an outer cylindrical surface located in the circumferential recess and has at least one fluid passage. The umbrella is pushed away from the sealing-surface portion under a forward fluid flow, and the umbrella is pushed against the sealing-surface portion under a reverse fluid flow.

A third expression of an embodiment of the invention is for an umbrella valve including an umbrella-valve body. The umbrella-valve body includes a stem, a flexible umbrella, and a flange. The stem includes a longitudinal axis. The umbrella and the flange are each attached to, and extend radially outward from, the stem. The flange has at least one fluid passage. The umbrella-valve body can be placed in a valve housing having a sealing-surface portion. The umbrella, when the umbrella-valve body is placed in the valve housing, is pushed away from the sealing-surface portion under a forward fluid flow and is pushed against the sealing-surface portion under a reverse fluid flow.

Several benefits and advantages are derived from one or more of the expressions of an embodiment of the invention.

In one example, having an umbrella valve with an umbrella and with a flange having at least one fluid passage allows the umbrella valve to be mounted in a bore of a valve body by having the outer cylindrical surface of the flange located in a circumferential recess of the valve body while allowing for fluid to pass through the at-least-one fluid passage of the flange.

DESCRIPTION OF THE PREFERRED EMBODIMENTS

Figure 1:
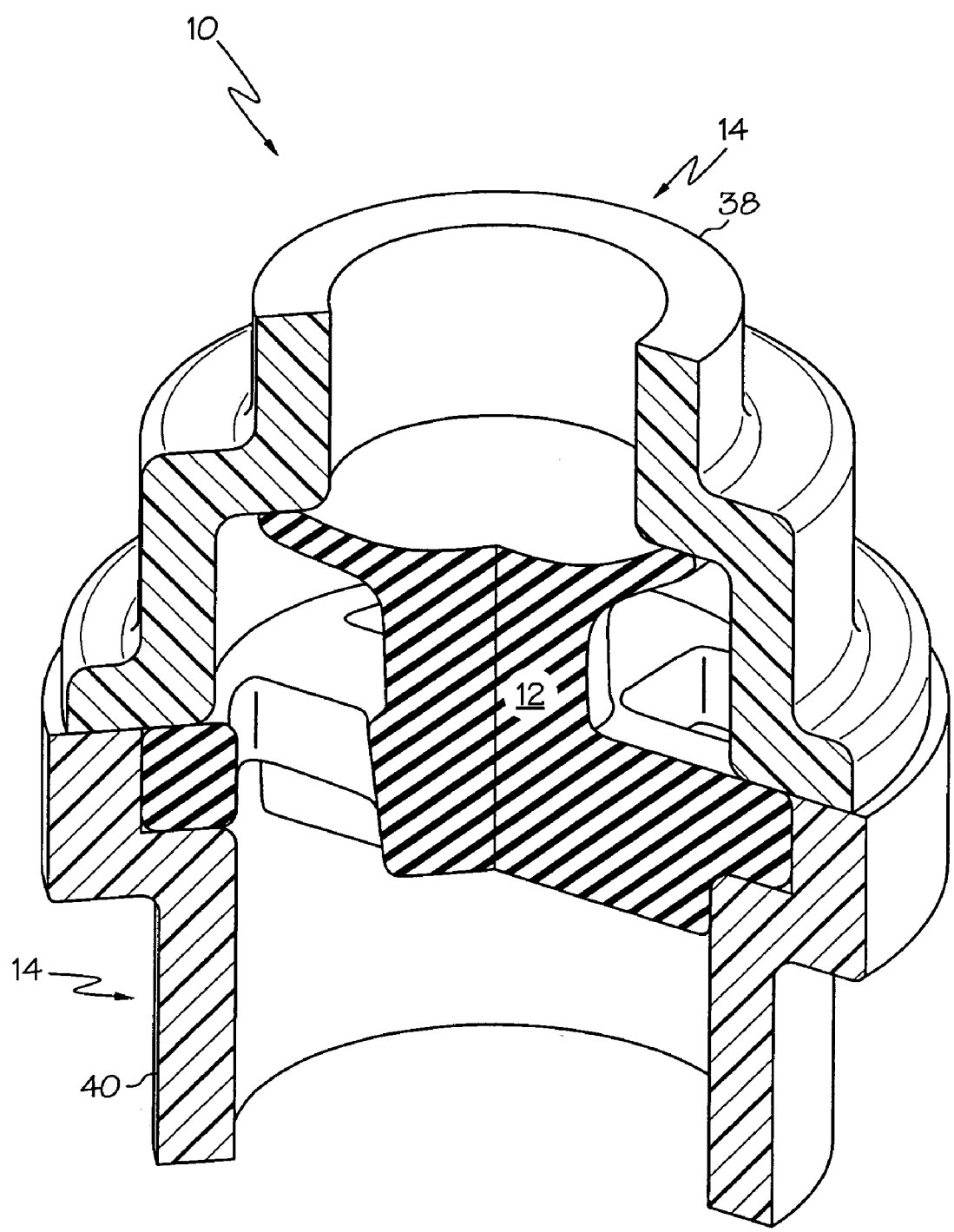
FIG. 1 is a perspective cutaway view of an embodiment of an umbrella valve assembly of the invention including an umbrella valve and a valve housing, wherein fluid has been omitted for clarity.
Figure 2:
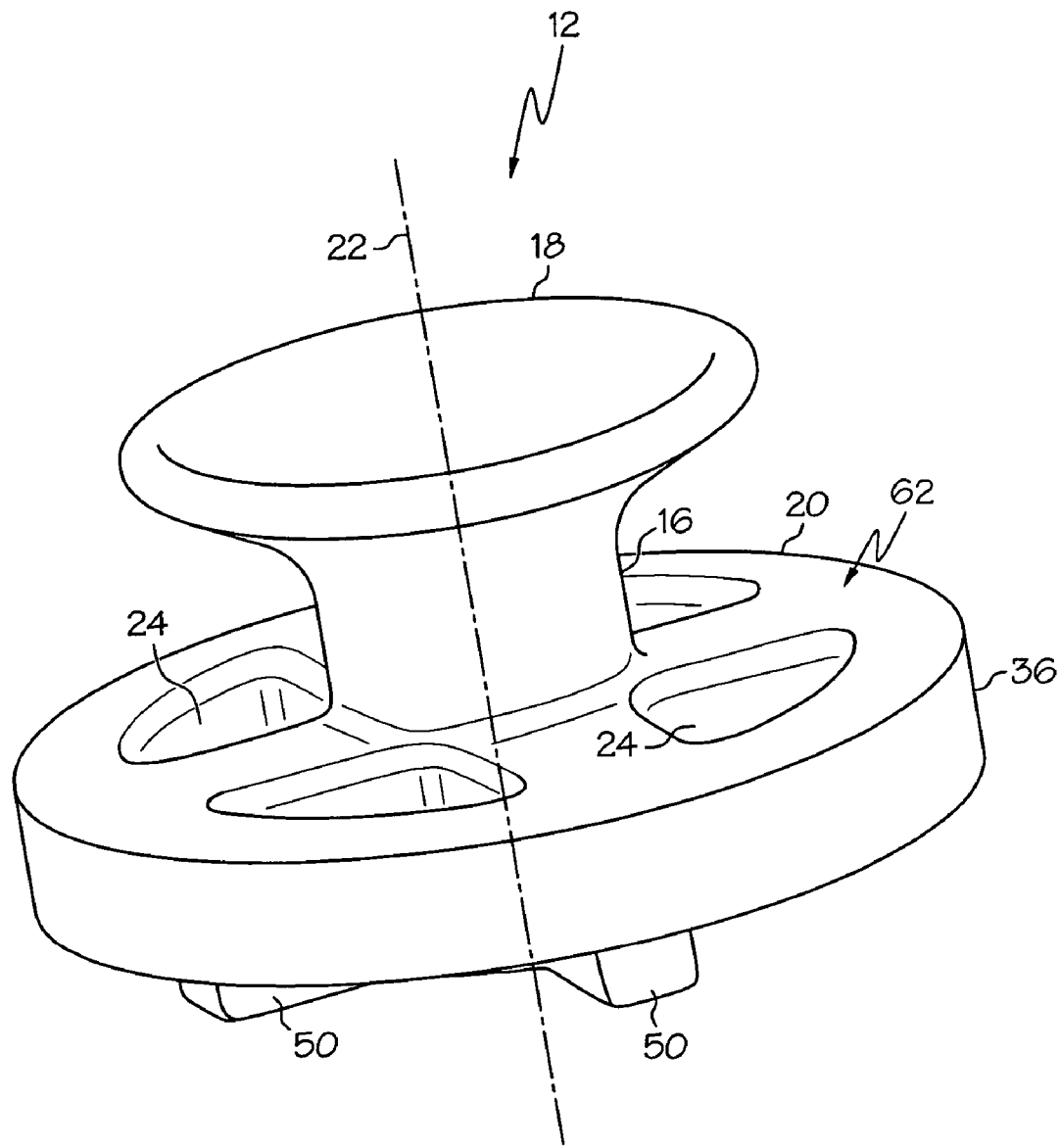
FIG. 2 is a perspective view of the umbrella valve of FIG. 1.

Referring now to the drawings, FIGS. 1-6 illustrate an embodiment of the present invention. A first expression of the embodiment shown in FIGS. 1-6 is for an umbrella valve assembly 10 including an umbrella valve 12 and a valve housing 14. The umbrella valve 12 includes a stem 16, a flexible umbrella 18, and a flange 20. The stem 16 includes a longitudinal axis 22. The umbrella 18 and the flange 20 each are attached to, and extend radially outward from, the stem 16. The flange 20 has at least one fluid passage 24. The valve housing 14 has a sealing-surface portion 26, and the umbrella valve 12 is disposed in the valve housing 14. The umbrella 18 is pushed away from the sealing-surface portion 26 under a forward fluid flow (indicated by arrows 28 in FIG. 5), and the umbrella 18 is pushed against the sealing-surface portion 26 under a reverse fluid flow (indicated by arrows 30 in FIG. 6). It is noted that the valve housing 14 has a radially-inwardly-facing surface which surrounds, and is spaced apart from, the umbrella 18 when the umbrella 18 is pushed away from and is pushed against the sealing-surface portion 26. It is also noted that no portion of any radially-inwardly-facing surface of the valve housing 14 is in contract with the umbrella 18 when the umbrella 18 is pushed away from the sealing-surface portion 26 and when the umbrella 18 is pushed against the sealing-surface portion 26.

For purposes of describing the embodiment of FIGS. 1-6, the terminology "a forward fluid flow" includes a forward pressure differential across the umbrella 18 wherein the forward fluid flow flows past the umbrella 18. Likewise, the terminology "a reverse fluid flow" includes a reverse pressure differential across the umbrella 18 wherein the reverse fluid flow is stopped from flowing past the umbrella 18. It is noted that a member which "extends radially outward from" something need not extend perpendicularly from that something and such member may or may not also extend longitudinally toward or away from something else.

In one construction of the first expression of the embodiment of FIGS. 1-6, the umbrella valve 12 is an elastomeric umbrella valve. The choice of elastomer or elastomers for the elastomeric umbrella valve depends upon the particular fluid (liquid and/or gas) environment as can be appreciated by the artisan. In one variation, the umbrella valve 12 is a monolithic umbrella valve. In another variation, not shown, one or more or all of the stem, the umbrella, and the flange are distinct members, and in one modification, one or more or all of the stem, the umbrella, and the flange comprise, consist essentially of, or consist of different materials (such as, for example, an elastomeric umbrella and an elastomeric flange each attached to a non-elastomeric stem).

In one employment of the first expression of the embodiment of FIGS. 1-6, the stem 16 is a substantially straight stem (i.e., a substantially right-circular cylindrical stem) having one end attached to the umbrella 18 and having another end attached to the flange 20. In another employment, not shown, the stem is not straight. In each of these employments, the stem 16 is that portion, however small or large, of the umbrella valve 12 which joins the umbrella 18 to the flange 20. It is noted that, in one example, the umbrella 18 includes a radially-outermost portion which is longitudinally spaced apart from the flange 20 under a forward fluid flow, under a reverse fluid flow, and in the absence of a pressure differential across the umbrella 18.

Figure 3:
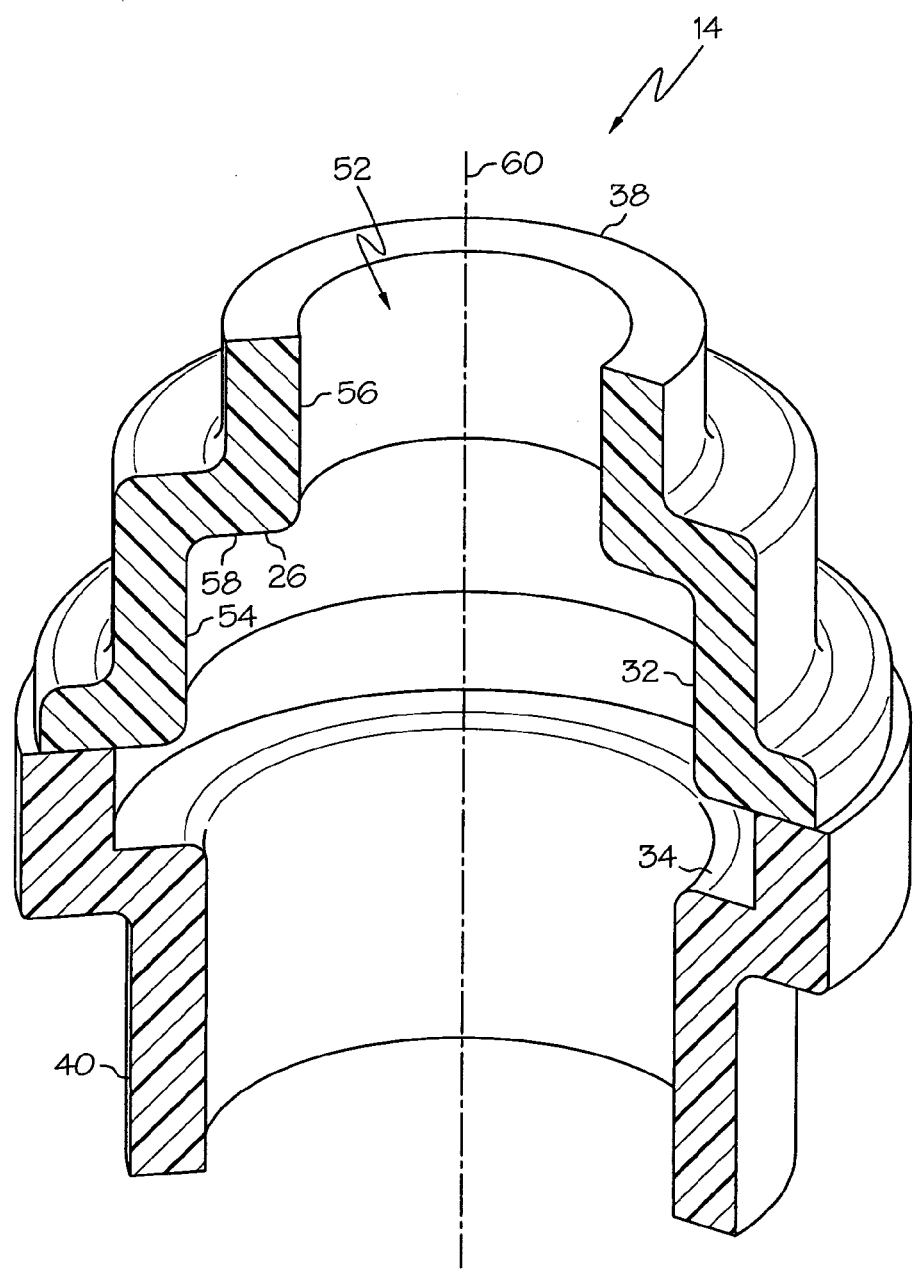
FIG. 3 is a perspective cutaway view of the valve housing of FIG. 1.
Figure 4:
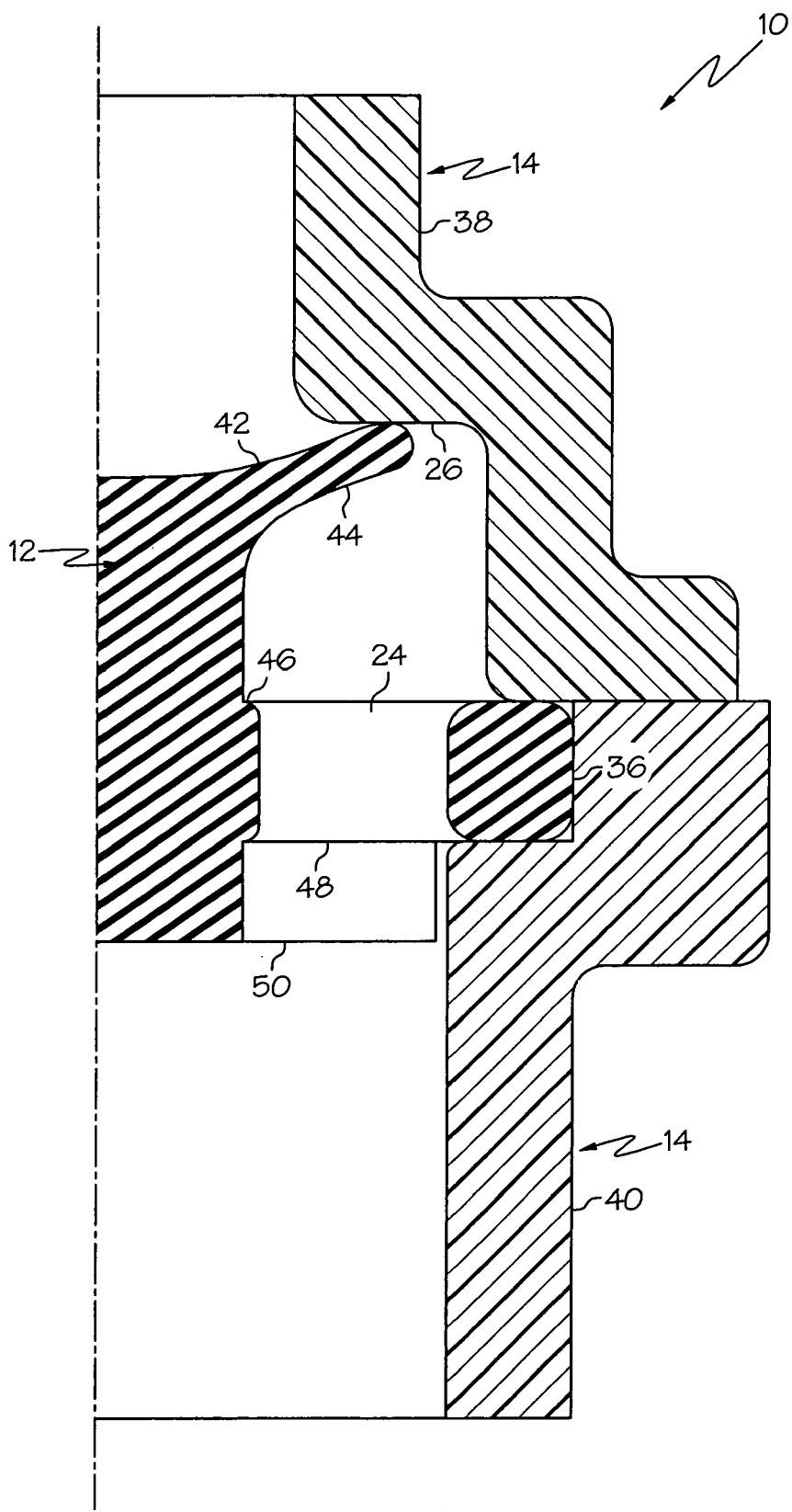
FIG. 4 is a cross-sectional view of a portion of the umbrella valve and valve body of FIG. 1 showing the position of the umbrella in the absence of a pressure differential across the umbrella.

In one arrangement of the first expression of the embodiment of FIGS. 1-6, the umbrella 18 is resilient and is biased against the sealing-surface portion 26 in the absence of a pressure differential across the umbrella 18 (as shown in FIG. 4). It is noted that the opening pressure for the umbrella valve 12 depends on the biasing pressure of the umbrella 18 against the sealing-surface portion 26, such opening pressure being designed to be higher by increasing the height of the unflexed umbrella 18 above the flange 20, and such opening pressure being designed to be lower by decreasing the height of the unflexed umbrella 18 above the flange 20 as can be appreciated by those skilled in the art.

In one application of the first expression of the embodiment of FIGS. 1-6, the valve housing 14 includes an inner wall surface 32 having a circumferential recess 34, and the flange 20 has an outer cylindrical surface 36 disposed in the circumferential recess 34. In one variation, the outer cylindrical surface 36 of the flange 20 is resilient and is in radial compression. In one modification, the flange 20 is in longitudinal compression in the circumferential recess 34.

In one enablement of the first expression of the embodiment of FIGS. 1-6, the valve housing 14 includes first and second valve-housing members 38 and 40, and the flange 20 is in longitudinal contact with the first and second valve-housing members 38 and 40 in the circumferential recess 34. In one implementation of the first expression of the embodiment of FIGS. 1-6, the flange 20 extends radially further from the stem 16 than does the umbrella 18. In another implementation, not shown, the umbrella extends radially further from the stem than does the flange.

Figure 5:
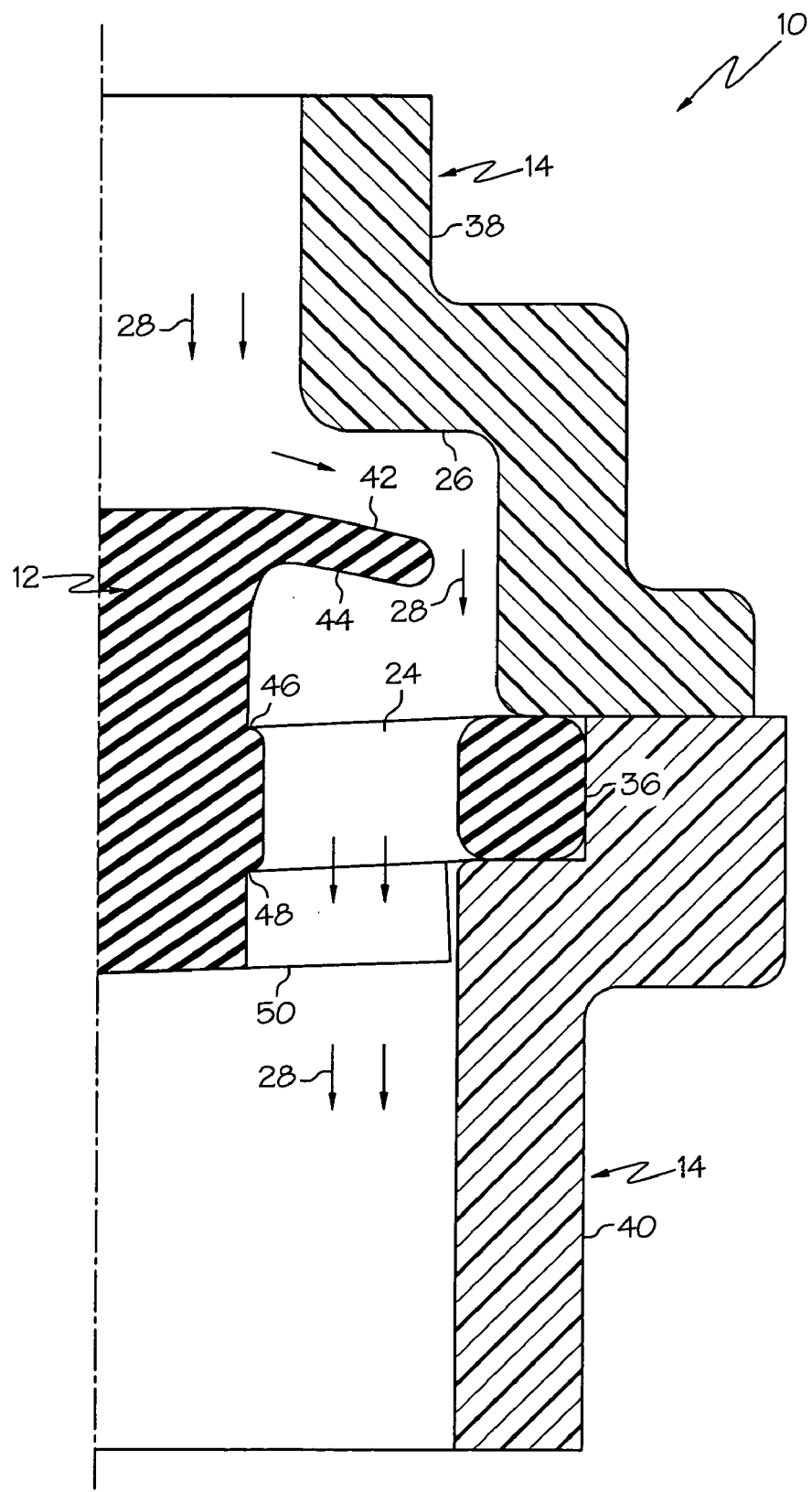
FIG. 5 is a view, as in FIG. 4, but showing the position of the umbrella in the presence of a forward fluid flow.
Figure 6:
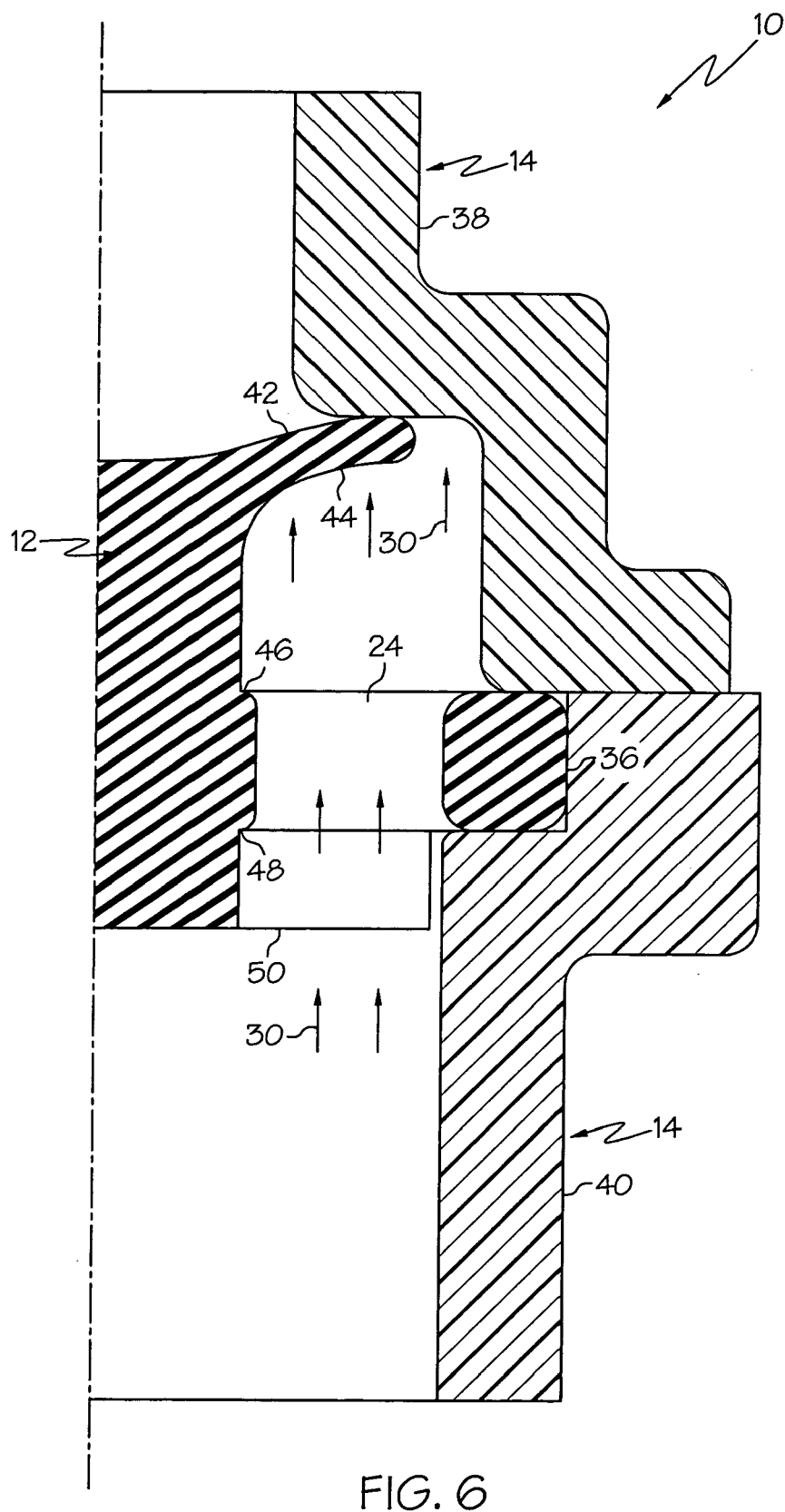
FIG. 6 is a view, as in FIG. 4, but showing the position of the umbrella in the presence of a reverse fluid flow.

In one deployment of the first expression of the embodiment of FIG. 1-6, under a forward fluid flow, fluid flows around the umbrella 18 and then through the at-least-one fluid passage 24 (as shown by arrows 28 in FIG. 5). In one example of this deployment, the umbrella 18 has opposing first and second umbrella surfaces 42 and 44, wherein the first umbrella surface 42 faces toward the sealing-surface portion 26, and wherein the second umbrella surface 44 faces toward the flange 20. In one variation of this example, the sealing-surface portion 26 is a longitudinally-facing portion of the inner wall surface 32 and faces toward, or away from, the flange 20. In another variation, not shown, the sealing-surface portion is a canted portion of the inner wall surface. In another example of this deployment, not shown, the sealing surface is a radially-inward-facing portion of the inner wall surface of the valve housing, and the umbrella extends radially outward from the stem and extends longitudinally toward the flange as can be understood by those skilled in the art.

In a different deployment, not shown, under a forward fluid flow, fluid flows through the at-least-one fluid passage and then around the umbrella. In one example, the sealing-surface portion is a longitudinally-facing portion of the inner wall surface and faces away from the flange with such sealing surface portion disposed longitudinally between the umbrella and the flange. In this example, the umbrella has opposing first and second umbrella surfaces, wherein the first umbrella surface faces toward the sealing-surface portion, and wherein the second umbrella surface faces away from the flange. In another example, the sealing-surface portion is a radially-inward-facing portion of the inner wall surface of the valve housing, and the umbrella extends radially outward from the stem and extends longitudinally away from the flange. Other deployments and examples are left to the artisan.

In one configuration of the first expression of the embodiment of FIGS. 1-6, the at-least-one fluid passage 24 includes a plurality of fluid passages 24 which are annularly arrayed. The flange 22 includes longitudinally-opposite-facing first and second flange surfaces 46 and 48. Each of the fluid passages 24 is a through passage extending from the first flange surface 46 to the second flange surface 48. In one variation, the umbrella valve 12 includes a radially-extending rib 50 attached to one of the first and second flange surfaces 46 and 48 and disposed between annularly-adjacent fluid passages 24. In one example, the ribs 50 provide stiffening for the portion of the flange 20 not disposed in the circumferential recess 34 while allowing the portion of the flange 20 disposed in the circumferential recess 34 to be in radial and/or longitudinal compression to secure the umbrella valve 12 to the valve housing 14, as can be appreciated by the artisan.

In one deployment of the first expression of the embodiment of FIGS. 1-6, the valve housing 14 has an inner wall surface 32 which surrounds a bore 52, which has a larger diameter portion 54 and a smaller diameter portion 56, and which has a shoulder 58 connecting the larger and smaller diameter portions 54 and 56, wherein the sealing-surface portion 26 is the shoulder 58. The shoulder 58 is also described as a valve seat. In one installation, useful when the valve housing 14 is a monolithic valve housing, the umbrella valve 12 is removably installed by inserting it into the bore 52 until the outer cylindrical surface 36 of the flange 20 of the umbrella valve 12 resiliently and compressively engages the circumferential recess 34 of the inner wall surface 32 of the valve housing 14. In another installation, useful when the valve housing includes first and second valve-housing members 38 and 40 as shown in FIG. 3, the umbrella valve 12 is installed by placing the outer cylindrical surface 36 of the flange 20 of the umbrella valve 12 longitudinally between the first and second valve-housing members 38 and 40 which are then attached together.

A second expression of the embodiment of FIGS. 1-6 is for an umbrella valve assembly 10 including a valve housing 14 and an umbrella valve 12. The valve housing 14 has an inner wall surface 32 which surrounds a bore 52 having a longitudinal axis 60, which has a sealing-surface portion 26, and which has a circumferential recess 34. The umbrella valve 12 includes a stem 16 having a longitudinal axis 22 and includes a flexible umbrella 18 and a flange 20 each attached to, and extending radially outward from, the stem 16. The umbrella valve 12 is disposed in the bore 52 with the longitudinal axis 22 of the stem 16 substantially coaxially aligned with the longitudinal axis 60 of the bore 52. The flange 20 has an outer cylindrical surface 36 disposed in the circumferential recess 34 and has at least one fluid passage 24. The umbrella 18 is pushed away from the sealing-surface portion 26 under a forward fluid flow (as indicated by arrows 28 in FIG. 5), and the umbrella 18 is pushed against the sealing-surface portion 26 under a reverse fluid flow (as indicated by arrows 30 in FIG. 6). It is noted that the valve housing 14 has a radially-inwardly-facing surface which surrounds, and is spaced apart from, the umbrella 18 when the umbrella 18 is pushed away from and is pushed against the sealing-surface portion 26. It is also noted that no portion of any radially-inwardly-facing surface of the valve housing 14 is in contract with the umbrella 18 when the umbrella 18 is pushed away from the sealing-surface portion 26 and when the umbrella 18 is pushed against the sealing-surface portion 26.

In one arrangement of the second expression of the embodiment of FIGS. 1-6, the umbrella 18 is resilient and is biased against the sealing-surface portion 26 in the absence of a pressure differential across the umbrella 18 (as shown in FIG. 4). It is noted that the constructions, applications, enablements, etc. of the first expression of the embodiment of FIGS. 1-6 are equally applicable to the second expression of the embodiment of FIGS. 1-6.

A third expression of the embodiment of FIGS. 1-6 is for an umbrella valve 12 including an umbrella-valve body 62. The umbrella-valve body 62 includes a stem 16, a flexible umbrella 18, and a flange 20. The stem 16 includes a longitudinal axis 22. The umbrella 18 and the flange 20 are each attached to, and extend radially outward from, the stem 16. The flange 20 has at least one fluid passage 24. The umbrella-valve body 62 is disposable in a valve housing 14 having a sealing-surface portion 26. The umbrella 18, when the umbrella-valve body 62 is disposed in the valve housing 14, is pushed away from the sealing-surface portion 26 under a forward fluid flow (as indicated by arrows 28 in FIG. 5) and is pushed against the sealing-surface portion 26 under a reverse fluid flow (as indicated by arrows 30 in FIG. 6). It is noted that the valve housing 14 has a radially-inwardly-facing surface which, when the umbrella-valve body 62 is disposed in the valve housing 14, surrounds, and is spaced apart from, the umbrella 18 when the umbrella 18 is pushed away from and is pushed against the sealing-surface portion 26. It is also noted that, when the umbrella-valve body 62 is disposed in the valve housing 14. no portion of any radially-inwardly-facing surface of the valve housing 14 is in contract with the umbrella 18 when the umbrella 18 is pushed away from the sealing-surface portion 26 and when the umbrella 18 is pushed against the sealing-surface portion 26.

In one implementation of the third expression of the embodiment of FIGS. 1-6, the flange 20 extends radially further from the stem 16 than does the umbrella 18. In one configuration of the third expression of the embodiment of FIGS. 1-6, the at-least-one fluid passage 24 includes a plurality of fluid passages 24 which are annularly arrayed. The flange 20 includes longitudinally-opposite-facing first and second flange surfaces 46 and 48. Each of the fluid passages 24 is a through passage extending from the first flange surface 46 to the second flange surface 48. In one variation, the umbrella-valve body 62 includes a radially-extending rib 50 attached to one of the first and second flange surfaces 46 and 48 and disposed between annularly-adjacent fluid passages 24. In one construction of the third expression of the embodiment of FIGS. 1-6, the umbrella-valve body 62 is an elastomeric umbrella-valve body. In one variation, the umbrella-valve body 62 is a monolithic umbrella-valve body.

It is noted that the constructions, applications, enablements, etc. of the first and/or second expressions of the embodiment of FIGS. 1-6 are equally applicable to the third expression of the embodiment of FIGS. 1-6.

Several benefits and advantages are derived from one or more of the expressions of an embodiment of the invention. In one example, having an umbrella valve with an umbrella and with a flange having at least one fluid passage allows the umbrella valve to be mounted in a bore of a valve body by having the outer cylindrical surface of the flange located in a circumferential recess of the valve body while allowing for fluid to pass through the at-least-one fluid passage of the flange.

The foregoing description of several expressions of an embodiment of the invention has been presented for purposes of illustration. It is not intended to be exhaustive or to limit the invention to the precise forms disclosed, and obviously many modifications and variations are possible in light of the above teaching. It is intended that the scope of the invention be defined by the claims appended hereto.

The invention claimed is:

1. An umbrella valve assembly comprising:
   a) an umbrella valve including a stem, a flexible umbrella, and a flange, wherein the stem includes a longitudinal axis, wherein the umbrella and the flange each are attached to, and extend radially outward from, the stem, and wherein the flange has at least one fluid passage; and
   b) a valve housing having a sealing-surface portion, wherein the umbrella valve is disposed in the valve housing, wherein the umbrella is pushed away from the sealing-surface portion under a forward fluid flow, wherein the umbrella is pushed against the sealing-surface portion under a reverse fluid flow, and wherein no portion of any radially-inwardly-facing surface of the valve housing is in contact with the umbrella when the umbrella is pushed away from the sealing-surface portion and when the umbrella is pushed against the sealing-surface portion.

2. The umbrella valve assembly of claim 1, wherein the umbrella valve is an elastomeric umbrella valve.

3. The umbrella valve assembly of claim 2, wherein the umbrella valve is a monolithic umbrella valve.

4. The umbrella valve assembly of claim 1, wherein the umbrella is resilient and is biased against the sealing-surface portion in the absence of a pressure differential across the umbrella.

5. The umbrella valve assembly of claim 1, wherein the valve housing includes an inner wall surface having a circumferential recess, and wherein the flange has an outer cylindrical surface disposed in the circumferential recess.

6. The umbrella valve assembly of claim 5, wherein the outer cylindrical surface of the flange is resilient and is in radial compression.

7. The umbrella valve assembly of claim 1, wherein the flange extends radially further from the stem than does the umbrella.

8. The umbrella valve assembly of claim 1, wherein, under a forward fluid flow, fluid flows around the umbrella and then through the at-least-one fluid passage.

9. The umbrella valve assembly of claim 1, wherein the umbrella has opposing first and second umbrella surfaces, wherein the first umbrella surface faces toward the sealing-surface portion, and wherein the second umbrella surface faces toward, or away from, the flange.

10. The umbrella valve assembly of claim 1, wherein the valve housing has an inner wall surface which surrounds a bore, which has a larger diameter portion and a smaller diameter portion, and which has a shoulder connecting the larger and smaller diameter portions, wherein the sealing-surface portion is the shoulder.

11. An umbrella valve assembly comprising:
a) an umbrella valve including a stem, a flexible umbrella, and a flange, wherein the stem includes a longitudinal axis, wherein the umbrella and the flange each are attached to, and extend radially outward from, the stem, and wherein the flange has at least one fluid passage; and
b) a valve housing having a sealing-surface portion, wherein the umbrella valve is disposed in the valve housing, wherein the umbrella is pushed away from the sealing-surface portion under a forward fluid flow, wherein the umbrella is pushed against the sealing-surface portion under a reverse fluid flow, wherein the valve housing has a radially-inwardly-facing surface which surrounds, and is spaced apart from, the umbrella when the umbrella is pushed away from and is pushed against the sealing-surface portion, wherein the valve housing includes an inner wall surface having a circumferential recess, wherein the flange has an outer cylindrical surface disposed in the circumferential recess, wherein the outer cylindrical surface of the flange is resilient and is in radial compression, and wherein the flange is in longitudinal compression in the circumferential recess.

12. The umbrella valve assembly of claim 11, wherein the valve housing includes first and second valve housing members, and wherein the flange is in longitudinal contact with the first and second valve housing members in the circumferential recess.

13. An umbrella valve assembly comprising:
a) an umbrella valve including a stem, a flexible umbrella, and a flange, wherein the stem includes a longitudinal axis, wherein the umbrella and the flange each are attached to, and extend radially outward from, the stem, and wherein the flange has at least one fluid passage; and
b) a valve housing having a sealing-surface portion, wherein the umbrella valve is disposed in the valve housing, wherein the umbrella is pushed away from the sealing-surface portion under a forward fluid flow, and wherein the umbrella is pushed against the sealing-surface portion under a reverse fluid flow,
wherein the at-least-one fluid passage includes a plurality of fluid passages which are annularly arrayed, wherein the flange includes longitudinally-opposite-facing first and second flange surfaces, and wherein the umbrella valve includes a radially-extending rib attached to one of the first and second flange surfaces and disposed between annularly-adjacent fluid passages.

14. An umbrella valve assembly comprising:
a) a valve housing having an inner wall surface which surrounds a bore having a longitudinal axis, which has a sealing-surface portion, and which has a circumferential recess; and
b) an umbrella valve including a stem having a longitudinal axis and including a flexible umbrella and a flange each attached to, and extending radially outward from, the stem, wherein the umbrella valve is disposed in the bore with the longitudinal axis of the stem substantially coaxially aligned with the longitudinal axis of the bore, wherein the flange has an outer cylindrical surface disposed in the circumferential recess and has at least one fluid passage, wherein the umbrella is pushed away from the sealing-surface portion under a forward fluid flow, wherein the umbrella is pushed against the sealing-surface portion under a reverse fluid flow, and wherein no portion of any radially-inwardly-facing surface of the valve housing is in contact with the umbrella when the umbrella is pushed away from the sealing-surface portion and when the umbrella is pushed against the sealing-surface portion.

15. The umbrella valve assembly of claim 14, wherein the umbrella is resilient and is biased against the sealing-surface portion in the absence of a pressure differential across the umbrella.

16. An umbrella valve comprising an umbrella-valve body including a stem, a flexible umbrella, and a flange, wherein the stem includes a longitudinal axis, wherein the umbrella and the flange are each attached to, and extend radially outward from, the stem, wherein the flange has at least one fluid passage, wherein the umbrella-valve body is disposable in a valve housing having a sealing-surface portion, wherein the umbrella, when the umbrella-valve body is disposed in the valve housing, is pushed away from the sealing-surface portion under a forward fluid flow and is pushed against the sealing-surface portion under a reverse fluid flow, and wherein, when the umbrella-valve body is disposed in the valve housing, no portion of any radially-inwardly-facing surface of the valve housing is in contact with the umbrella when the umbrella is pushed away from the sealing-surface portion and when the umbrella is pushed against the sealing-surface portion.

17. The umbrella valve of claim 16, wherein the flange extends radially further from the stem than does the umbrella.

18. The umbrella valve of claim 16 wherein the umbrella-valve body is an elastomeric umbrella-valve body.

19. The umbrella valve of claim 18, wherein the umbrella-valve body is a monolithic umbrella-valve body.

20. An umbrella valve comprising an umbrella-valve body including a stem, a flexible umbrella, and a flange, wherein the stem includes a longitudinal axis, wherein the umbrella and the flange are each attached to, and extend radially outward from, the stem, wherein the flange has at least one fluid passage, wherein the umbrella-valve body is disposable in a valve housing having a sealing-surface portion, wherein the umbrella, when the umbrella-valve body is disposed in the valve housing, is pushed away from the sealing-surface portion under a forward fluid flow and is pushed against the sealing-surface portion under a reverse fluid flow, wherein the at-least-one fluid passage includes a plurality of fluid passages which are annularly arrayed, wherein the flange includes longitudinally-opposite-facing first and second flange surfaces, and wherein the umbrella-valve body includes a radially-extending rib attached to one of the first and second flange surfaces and disposed between annularly-adjacent fluid passages.

* * * * *